(12) United States Patent
Hiraoka et al.

(10) Patent No.: US 7,561,315 B2
(45) Date of Patent: Jul. 14, 2009

(54) IMAGE READING APPARATUS

(75) Inventors: Shinichiroh Hiraoka, Yamatokoriyama (JP); Hirotoshi Iemura, Nara (JP); Hironori Ogasawara, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 602 days.

(21) Appl. No.: 11/222,970

(22) Filed: Sep. 12, 2005

(65) Prior Publication Data

US 2006/0061839 A1    Mar. 23, 2006

(30) Foreign Application Priority Data

Sep. 21, 2004    (JP) ............................. 2004-273163

(51) Int. Cl.
   *H04N 1/04* (2006.01)
(52) U.S. Cl. ...................... 358/498; 358/496; 358/497; 358/474; 358/471; 399/364; 399/374; 399/367
(58) Field of Classification Search ................ 358/496, 358/498, 497, 474, 401, 501, 505, 471; 399/374, 399/364, 367; 355/23
   See application file for complete search history.

(56) References Cited

U.S. PATENT DOCUMENTS 6,640,082 B2    10/2003  Mitomi
7,202,983 B2 *   4/2007  Yokota et al. ............... 358/496

FOREIGN PATENT DOCUMENTS

| JP | 2000-115452 A | 4/2000 |
| JP | 2002-182437 A | 6/2002 |
| JP | 2002-314766 | 10/2002 |
| JP | 2003-234874 | 8/2003 |
| JP | 2003-309703 | 10/2003 |
| JP | 2003-324579 A | 11/2003 |

* cited by examiner

*Primary Examiner*—Cheukfan Lee
(74) *Attorney, Agent, or Firm*—Nixon & Vanderhye P.C.

(57) ABSTRACT

An image reading apparatus is provided with a first image reading unit and a second image reading unit. The first image reading unit reads an image on a first side of a document that is transported in a predetermined direction on a document transport path, at a first image reading position. The second image reading unit reads an image on a second side of the document that is transported in the predetermined direction on the document transport path, at a second image reading position. A transport roller and a bent portion of the document transport path are arranged in this order along the document transport direction upstream of each of the first image reading position and the second image reading position in the document transport direction.

7 Claims, 5 Drawing Sheets

IMAGE READING APPARATUS

CROSS REFERENCE

This Nonprovisional application claims priority under 35 U.S.C. § 119(a) on Patent Application No. 2004-273163 filed in Japan on Sep. 21, 2004, the entire contents of which are hereby incorporated by reference.

BACKGROUND

The subject matter of this disclosure relates to an image reading apparatus for reading images on both sides of a document that is transported in a predetermined direction on a document transport path.

Some conventional image reading apparatuses are configured such that images on both sides of a document are read while the document is transported once onto a document transport path, as disclosed in JP 2002-182437A, for example. FIG. 1 is a cross-sectional view showing a structural overview of a conventional image reading apparatus 100. The image reading apparatus 100 is provided with a document feeding tray 101, a document discharge tray 102, a document transport path 103, an image reading unit 104, and an image reading unit 105.

The document transport path 103 extends from the document feeding tray 101 to the document discharge tray 102. A document is transported on the document transport path 103 from the document feeding tray 101 to the document discharge tray 102. The image reading unit 104 and the image reading unit 105 are opposed to the document in this order along the document transport direction on the document transport path 103. The image reading unit 104 reads an image on a first side of the document with a CCD (charge coupled device) sensor. The image reading unit 105 reads an image on a second side of the document with a CIS (contact image sensor).

Transport rollers 106 and a bent portion 107 of the document transport path 103 are arranged in this order along the document transport direction upstream of the image reading unit 104 in the document transport direction. On the other hand, a portion between the image reading unit 104 and the image reading unit 105 on the document transport path 103 is formed as a substantially straight line.

The reading resolution of the image reading unit 104 is significantly different from that of the image reading unit 105, because of the difference between their reading elements. For this reason, in the conventional image reading apparatus 100, the image resolution is significantly different between the image on the first side and the image on the second side based on the acquired image data, and thus the capability to perform two different types of image processes, namely, the image process for the image data of the first side and the image process for the image data of the second side, is necessary.

Furthermore, as contrasted with the depth of focus (about 2 mm to 3 mm) of the CCD sensor provided in the image reading unit 104, the depth of focus (about 0.5 mm to 1 mm) of the CIS provided in the image reading unit 105 is small. Thus, as shown in FIG. 2, a region 109 in which the CIS provided in the image reading unit 105 is focused is small relative to a transport region 108 in the height direction of the document transport path 103. Therefore, when the document is transported through the transport region 108 without passing through the region 109, the image based on the image data acquired by the image reading unit 105 is defocused.

As described above, the portion between the image reading unit 104 and the image reading unit 105 on the document transport path 103 is formed as a substantially straight line. For this reason, the position through which the document is transported in the transport region 108 is not constant. Accordingly, in FIG. 2, image data with high definition is acquired when the document is transported through transport position 113 or 114, but an image based on the acquired image data is defocused when the document is transported through the transport position 111 or 112, of the transport positions 111 to 114.

Furthermore, since the conventional image reading apparatus 100 has been made smaller, the image reading unit 104 provided with the CCD sensor is located close to the image reading unit 105 provided with the CIS. In addition, as described above, the document transport path 103 between the image reading unit 104 and the image reading unit 105 is formed as a substantially straight line. Therefore, light emitted from either one image reading unit of the image reading unit 104 and the image reading unit 105 travels along the document transport path 103 to be incident as stray light on the other image reading unit, and the definition of the image based on the image data acquired by the image reading unit on which the stray light is incident is degraded.

In one aspect, an image reading apparatus is provided that is capable of acquiring image data without defocusing, for example, by eliminating irregularities in document transport positions in the direction perpendicular to the face of the document at the image reading positions.

In another aspect, an image reading apparatus is provided that is capable of reading images accurately, for example, by preventing stray light from being incident.

In yet another aspect, an image reading apparatus is provided for making an image process easy after reading images.

SUMMARY

An image reading apparatus according to one embodiment is provided with a first image reading unit and a second image reading unit. The first image reading unit reads an image on a first side of a document that is transported in a predetermined direction on a document transport path, at a first image reading position. The second image reading unit reads an image on a second side of the document that is transported in the predetermined direction on the document transport path, at a second image reading position. A transport roller and a bent portion of the document transport path are arranged in this order along the document transport direction upstream of each of the first image reading position and the second image reading position in the document transport direction.

The bent portion is disposed between the first image reading position and the second image reading position, and thus light emitted from one image reading unit onto the document can be prevented from being incident as stray light on the image reading position for the other image reading unit.

The transport roller and the bent portion are arranged in this order along the document transport direction upstream of each of the first image reading position and the second image reading position, and thus the document is transported through a constant position in the direction perpendicular to the face of the document on the document transport path at each of the image reading positions. Thus, focusing can be attained more easily for each of the first side and the second side of the document.

DESCRIPTION OF THE INVENTION

Figure 1:
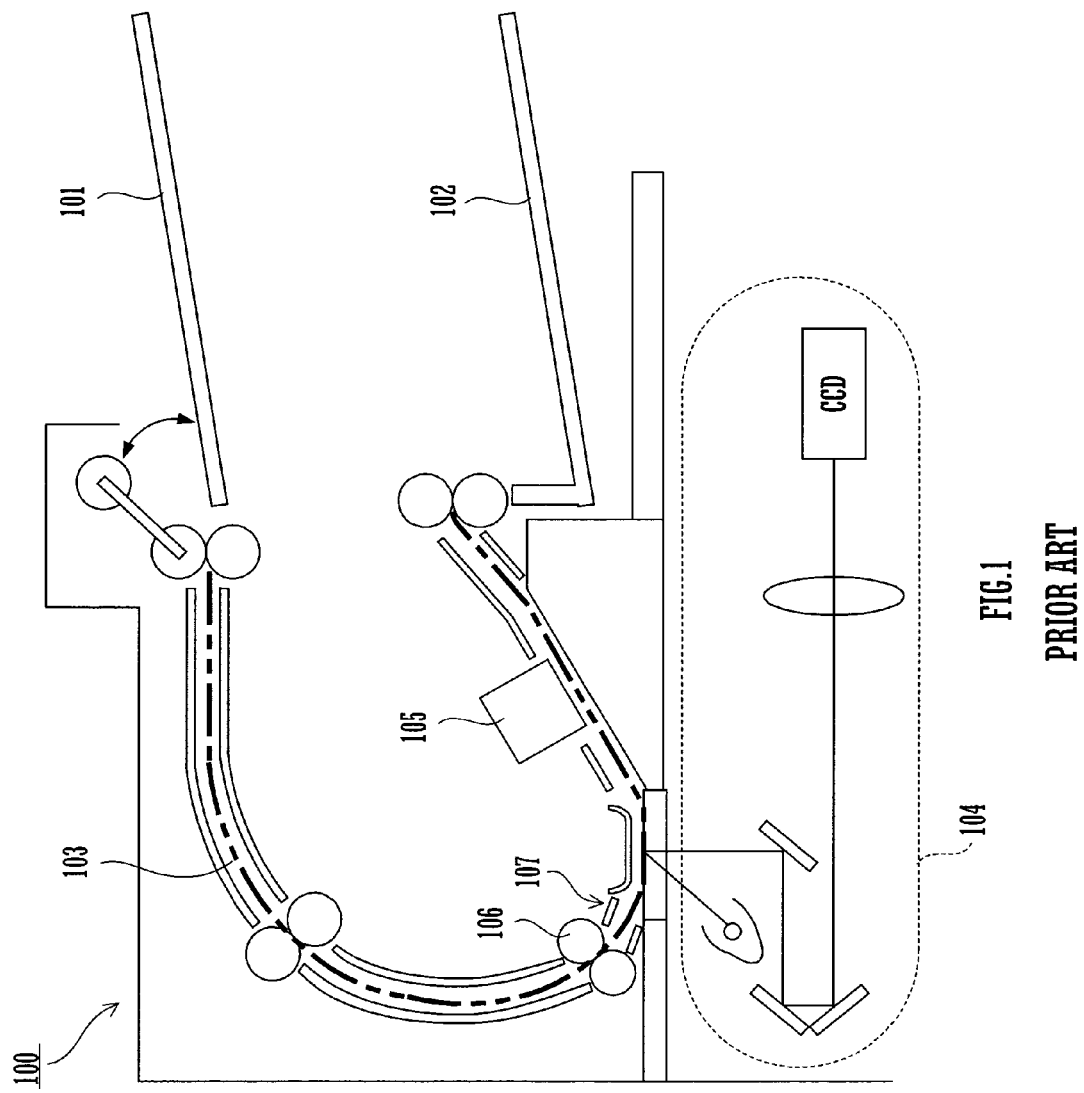
FIG. 1 is a cross-sectional view showing a structural overview of a conventional image reading apparatus.
Figure 2:
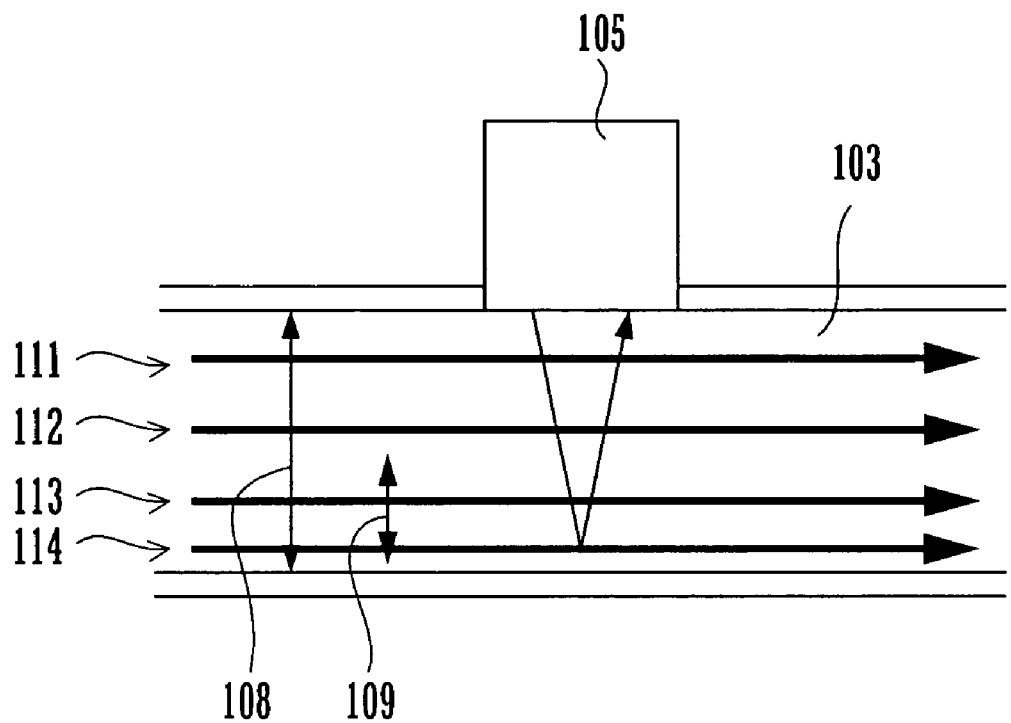
FIG. 2 is an explanatory diagram showing the relationship between document transport positions and regions in which an image reading unit is focused, on a document transport path in the conventional image reading apparatus.
Figure 3:
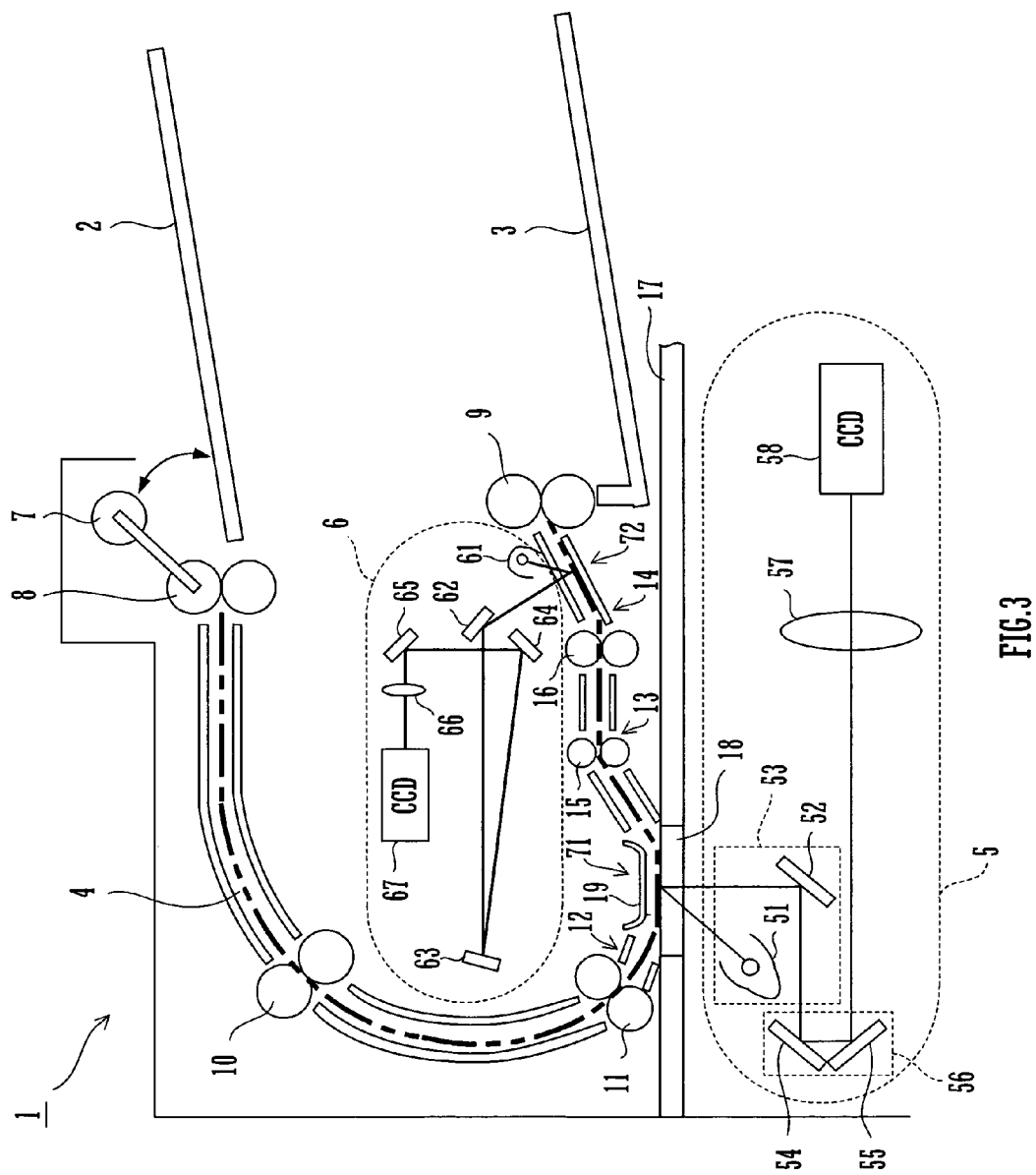
FIG. 3 is a cross-sectional view showing a structural overview of an image reading apparatus according to an embodiment of the present invention.

Hereinafter, embodiments of the present invention will be described with reference to the drawings. FIG. 3 is a cross-sectional view showing a structural overview of an image reading apparatus 1 according to an embodiment of the present invention. The image reading apparatus 1 is provided with a document feeding tray 2, a document discharge tray 3, a document transport path 4, a first image reading unit 5, a second image reading unit 6, and a platen glass 17, for example. The platen glass 17 corresponds to a document platen.

The first image reading unit 5 reads an image on a first side of a document. The second image reading unit 6 reads an image on a second side of the document.

The document transport path 4 extends from the document feeding tray 2 to the document discharge tray 3. Documents are transported on the document transport path 4 from the document feeding tray 2 to the document discharge tray 3. A pick-up roller 7 and separation rollers 8 are arranged at the upstream end of the document transport path 4 in the document transport direction. Documents placed on the document feeding tray 2 are supplied onto the document transport path 4 one by one by the pick-up roller 7 and the separation rollers 8. Furthermore, discharge rollers 9 are arranged at the downstream end of the document transport path 4 in the document transport direction. The documents that have been transported onto the document transport path 4 are discharged into the document discharge tray 3 by the discharge rollers 9.

An image reading position 71 for the first image reading unit 5 and an image reading position 72 for the second image reading unit 6 are arranged on the document transport path 4. The image reading position 71 corresponds to a first image reading position. The image reading position 72 corresponds to a second image reading position. Transport rollers 10, transport rollers 11, and a bent portion 12 of the document transport path 4 are arranged in this order along the document transport direction upstream of the image reading position 71 in the document transport direction. Each of the transport rollers 10 and 11 is driven by a document transport motor 35, and transports the document to the image reading position 71. The bent portion 12 is curved to be convex toward the lower left direction in FIG. 3.

A bent portion 13 that is convex upward and a bent portion 14 that is convex downward are arranged on the document transport path 4 between the image reading position 71 and the image reading position 72. Driven rollers 15 are arranged at the bent portion 13. Transport rollers 16 are arranged in the vicinity of the bent portion 14 on its upstream side. The transport rollers 16 are driven by the document transport motor 35 (see FIG. 5), and transport the document to the image reading position 72.

The first image reading unit 5 is provided with a first scanning unit 53, a second scanning unit 56, an imaging lens 57, and a CCD sensor 58. The first scanning unit 53 is provided with an exposure lamp 51 and a first reflection mirror 52. The second scanning unit 56 is provided with a second reflection mirror 54 and a third reflection mirror 55. The first scanning unit 53 and the second scanning unit 56 correspond to scanning units in this embodiment. The imaging lens 57 corresponds to a demagnifying optical component.

Light emitted from the exposure lamp 51 and reflected by the first side of the document is sequentially reflected by the first reflection mirror 52, the second reflection mirror 54 and the third reflection mirror 55, and is then incident on the imaging lens 57. The imaging lens 57 forms an image of the incident light on the CCD sensor 58. The CCD sensor 58 photoelectrically converts the light image formed by the imaging lens 57, and then reads the obtained image data.

Each of the first scanning unit 53 and the second scanning unit 56 can be displaced in the sub scanning direction along the platen glass 17.

The image reading apparatus 1 performs an image reading operation in either of a document fixing mode or a document transferring mode. During an image reading operation in the document fixing mode, the first image reading unit 5 reads the image on the document placed on the platen glass 17 and acquires the image data, by displacing the first scanning unit 53 and the second scanning unit 56 in the sub scanning direction. Furthermore, during an image reading operation in the document transferring mode, the first image reading unit 5 reads the image on the document that is being transported onto the document transport path 4 and acquires the image data, after stopping the first scanning unit 53 and the second scanning unit 56 at predetermined positions.

Herein, the stopping positions of the first scanning unit 53 and the second scanning unit 56 during an image reading operation in the document transferring mode are set to be home positions of the first scanning unit 53 and the second scanning unit 56 during an image reading operation in the document fixing mode.

Furthermore, a platen glass 18 is disposed at the image reading position 71. The platen glass 18 constitutes a part of the lower wall of the document transport path 4. Light emitted from the exposure lamp 51 passes through the platen glass 18 and is emitted onto the document. A standard white board 19 is disposed on the wall opposed to the platen glass 18 on the document transport path 4 at the image reading position 71. The standard white board 19 is used for shading compensation. A dirt removing member is disposed at the bent portion 12 located upstream of the standard white board 19. The dirt removing member is made of PET (polyethylene terephthalate).

The second image reading unit 6 is provided with an exposure lamp 61, a plurality of reflection mirrors 62, 63, 64, and 65, an imaging lens 66, and a CCD sensor 67. The imaging lens 66 corresponds to another demagnifying optical component.

Light emitted from the exposure lamp 61 and reflected by the second side of the document is sequentially reflected by the reflection mirrors 62 to 65, and is then incident on the imaging lens 66. The imaging lens 66 forms an image of the incident light on the CCD sensor 67. The CCD sensor 67 photoelectrically converts the light image formed by the imaging lens 66, and then reads the obtained image data. The resolution of the CCD sensor 67 reading images is substantially the same as the resolution of the CCD sensor 58 reading images in the first image reading unit 5.

Figure 4:
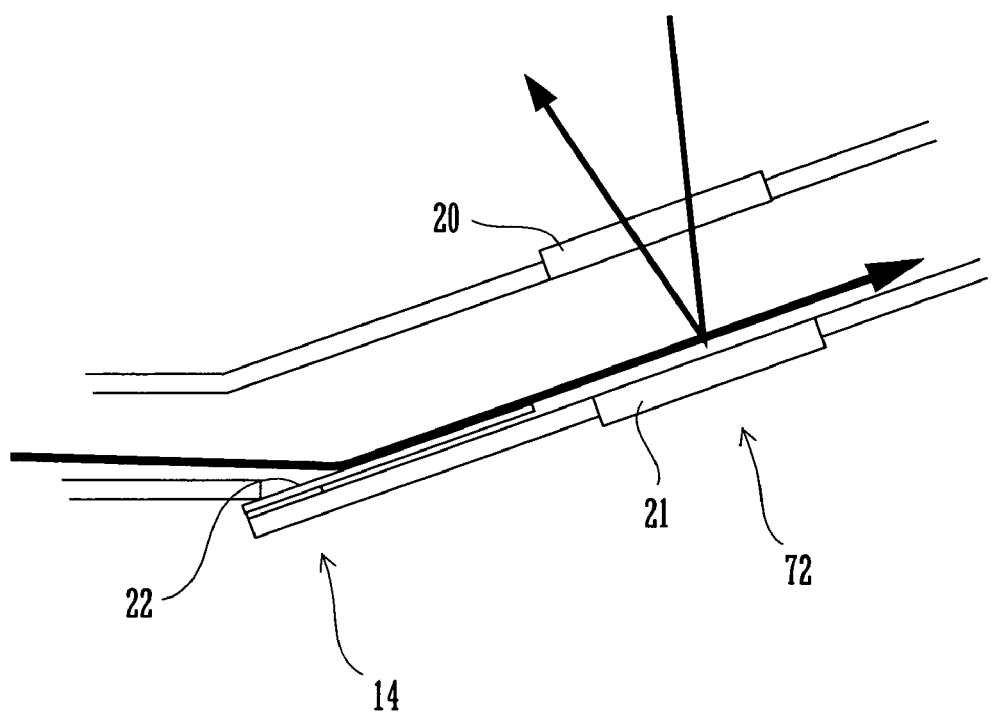
FIG. 4 is an enlarged view showing the configuration of a part of the image reading apparatus.

FIG. 4 is an enlarged view showing the configuration of the vicinity of the image reading position 72 in the image reading apparatus 1. A platen glass 20 is disposed at the image reading position 72. The platen glass 20 constitutes a part of the upper wall of the document transport path 4. Light emitted from the exposure lamp 61 passes through the platen glass 20 and is emitted onto the document. A standard white board 21 is disposed on the wall (lower wall) opposed to the platen glass 20 on the document transport path 4 at the image reading position 72. The standard white board 21 is used for shading compensation.

A dirt removing member 22 is disposed at the bent portion 14 located directly upstream of the standard white board 21, and on the inner lower wall of the document transport path 4. The dirt removing member 22 is made of PET. The document that has been transported onto the document transport path 4 is transported abutting against the lower wall of the document transport path 4 in the portion downstream of the bent portion 14. At that time, the document moves abutting against the dirt removing member 22, and thus dirt on the first side of the document (the lower face in FIG. 4) is removed. This configuration prevents the standard white board 21 from being dirty with the dirt on the document.

Furthermore, similarly to the dirt removing member 22 at the bent portion 14, the above-described dirt removing member at the bent portion 12 is disposed on the inner wall of the outer peripheral portion (lower side) of the curve, and dirt on the first side of the document (the lower face in FIG. 3) is removed by the document being transported abutting against the dirt removing member. This configuration prevents the platen glass 18 from being dirty. When the platen glass 18 is prevented from being dirty, there is no dirt attached to the platen glass 18 and scattered by the front edge of paper, for example, and thus the standard white board 19 is also prevented from being dirty.

Figure 5:
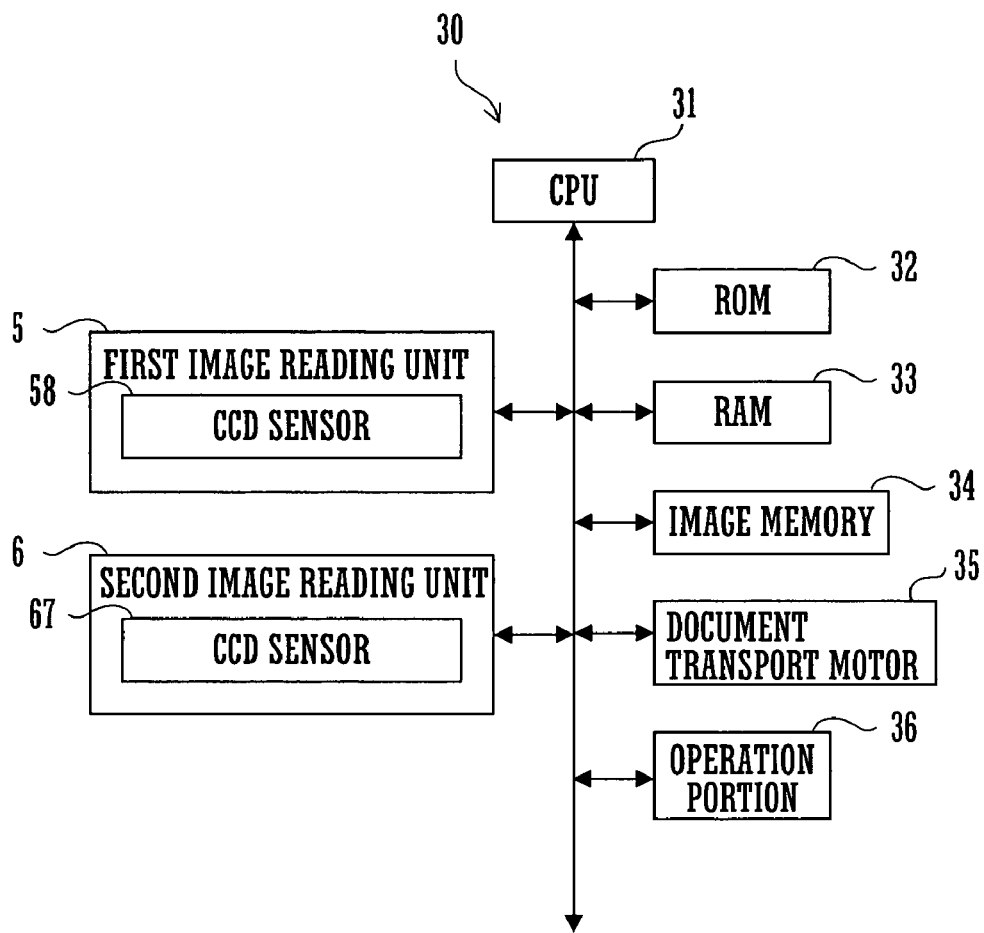
FIG. 5 is a block diagram showing a structural overview of the image reading apparatus.

FIG. 5 is a block diagram showing a structural overview of the image reading apparatus 1. The image reading apparatus 1 is further provided with a control portion 30. The control portion 30 is constituted from, for example, a CPU 31, a ROM 32, a RAM 33, and an image memory 34. The ROM 32 stores a predetermined program for operating the image reading apparatus 1. The RAM 33 is a non-volatile memory, and serves as the working area of the CPU 31. The image memory 34 stores acquired image data.

The CPU 31 is connected to input/output devices such as the document transport motor 35, an operation portion 36, the CCD sensor 58 in the first image reading unit 5, a first image reading unit load device including a driving motor for displacing the first scanning unit 53 and the second scanning unit 56, the CCD sensor 67 in the second image reading unit 6, and a second image reading unit load device, other than the ROM 32, the RAM 33, and the image memory 34. The document transport motor 35 drives, for example, the transport rollers 10, 11, and 16. The operation portion 36 is constituted from, for example, a start key for starting the process of reading images and a touch panel on which various conditions and settings are entered. The CPU 31 performs overall control of the input/output devices described above.

In the thus configured image reading apparatus 1, a document placed on the document feeding tray 2 is supplied onto the document transport path 4 by the pick-up roller 7, and is transported to the further downstream by the transport rollers 10. Then, the transport rollers 11 applies a transporting force to the document, and the document is thus transported to the image reading position 71 while it abuts against the inner lower wall of the transport path 4 in the bent portion 12.

The transport rollers 11 and the bent portion 12 are arranged in this order upstream of the image reading position 71 in the document transport direction, and thus when the document is being transported through the image reading position 71, it always abuts against the inner lower wall of the document transport path 4.

The document is transported always through a constant position in the height direction (a constant position in the direction perpendicular to the face of the document) on the document transport path 4, at the image reading position 71, and thus the CCD sensor 58 provided in the first image reading unit 5 can be easily focused on the document. Accordingly, the first image reading unit 5 acquires image data of the image on the first side of the document, without defocusing.

The image on the first side of the document is read at the image reading position 71, and then the document is further transported by the transport rollers 11 via the bent portion 13 and the bent portion 14 to the image reading position 72. The document is smoothly transported by being guided by the driven rollers 15 at the bent portion 13. When the front edge of the document reaches the transport rollers 16, the transport rollers 16 apply a transporting force to the document. Then, the document is transported to the further downstream while abutting against the inner lower wall of the document transport path 4 at the bent portion 14.

The transport rollers 16 and the bent portion 14 are arranged in this order upstream of the image reading position 72 in the document transport direction, and thus when the document is being transported through the image reading position 72, it always abuts against the inner lower wall of the document transport path 4. The document is transported always through a constant position in the height direction (a constant position in the direction perpendicular to the face of the document) on the document transport path 4, at the image reading position 72, and thus the CCD sensor 67 provided in the second image reading unit 6 can be easily focused on the document. Accordingly, the second image reading unit 6 acquires image data of the image on the second side of the document, without defocusing.

The plurality of bent portions 13 and 14 are provided between the image reading position 71 for the first image reading unit 5 and the image reading position 72 for the second image reading unit 6, and light emitted from the first image reading unit 5 onto the document is prevented, to a considerable extent, from traveling along the document transport path 4 to be incident as stray light on the image reading position 72. In a similar manner, light emitted from the second image reading unit 6 onto the document is prevented, to a considerable extent, from being incident as stray light on the image reading position 71.

In the image reading apparatus 1, the bent portions 13 and 14 are provided between the image reading position 71 and the image reading position 72, and thus light emitted from either one image reading unit of the first image reading unit 5 and the second image reading unit 6 onto the document can be prevented from being incident as stray light on the image reading position for the other image reading unit.

Furthermore, the transport rollers 11 and the bent portion 12 are arranged in this order along the document transport direction upstream of the image reading position 71, and the transport rollers 16 and the bent portion 14 are arranged in this order along the document transport direction upstream of the image reading position 72, so that the document is transported always through a constant position in the direction perpendicular to the face of the document at each of the image reading positions 71 and 72.

Accordingly, focusing can be easily attained for the first side and the second side of the document at the image reading positions 71 and 72, and thus it is possible to acquire image data of the image, without defocusing, for each of the first side and the second side of the document.

Furthermore, the first image reading unit 5 is provided with the CCD sensor 58, and the second image reading unit 6 is provided with the CCD sensor 67, so that the depth of focus is large at both of the image reading positions 71 and 72, and focusing on the document is performed more easily. Thus, it is possible to acquire image data of the image with less defocusing.

Furthermore, it is possible to acquire image data of the same resolution for the first side and the second side of the document, and thus the image process for the image data of the first side can be the same as the image process for the image data of the second side. Accordingly, an image can be easily processed after the image has been read.

Furthermore, the first image reading unit 5 is configured so as to be capable of performing both of an image reading operation in the document transferring mode and an image reading operation in the document fixing mode, and thus it is not necessary to separately provide an image reading unit for performing an image reading operation in the document fixing mode and an image reading unit for performing an image reading operation in the document transferring mode. Accordingly, the number of the components is decreased and the image reading apparatus 1 can be made smaller.

Furthermore, the positions of the first scanning unit 53 and the second scanning unit 56 during an image reading operation in the document transferring mode are set to be home positions of the first scanning unit 53 and the second scanning unit 56 during an image reading operation in the document fixing mode, and thus the standard white board for shading compensation during the image reading operation in the document transferring mode can be also used as the standard white board for shading compensation during the image reading operation in the document fixing mode. Accordingly, the number of the standard white board for shading compensation provided in the first image reading unit 5 can be one, and thus the number of the components can be reduced.

Furthermore, it is not necessary to provide regions serving as the home positions of the first scanning unit 53 and the second scanning unit 56 during the image reading operation in the document fixing mode separately from the positions of the first scanning unit 53 and the second scanning unit 56 during the image reading operation in the document transferring mode, and thus the image reading apparatus 1 can be made smaller.

Furthermore, both of the first image reading unit 5 and the second image reading unit 6 include the demagnifying optical components, and thus the optical paths for reading images in the image reading units 5 and 6 are shortened, so that the image reading apparatus 1 can be made smaller.

Furthermore, the standard white board 19 is disposed in the first image reading unit 5 and the standard white board 21 is disposed in the second image reading unit 6, and shading compensation is performed in each of the first image reading unit 5 and the second image reading unit 6, so that it is possible to acquire high quality image data for both of the front and rear sides of a document.

Furthermore, dirt on the document is removed with the dirt removing member upstream of the image reading position 71, and thus the platen glass 18 and the standard white board 19 are prevented from being dirty, so that the life of the standard white board 19 can be prolonged. In a similar manner, dirt on the document is removed with the dirt removing member 22 upstream of the image reading position 72, and thus the standard white board 21 is prevented from being dirty, so that the life of the standard white board 21 can be prolonged.

It should be noted that a CIS may be used instead of the CCD sensor 67 in the second image reading unit 6. Also in this case, it is possible to prevent stray light from being incident on the image reading positions 71 and 72.

The distance between the image reading position 71 and the image reading position 72 may be greater than the distance in the conventional image reading apparatus 100 so that the bent portions 13 and 14 can be easily provided between the image reading position 71 and the image reading position 72. When the distance between the image reading position 71 and the image reading position 72 is made greater, light emitted from either one image reading unit of the first image reading unit 5 and the second image reading unit 6 becomes more unlikely to be incident as stray light on the other image reading unit.

In the aforementioned embodiment, the number of the bent portions provided between the image reading position 71 and the image reading position 72 is two. However, the number of the bent portions provided may be one, or three or more. In this case, it is preferable to arrange, for example, transport rollers and driven rollers at appropriate positions so that the capability in transporting documents is not impaired.

Furthermore, in the present invention, the bent portion may be a curved portion in the form of a curve like a circular arc. In the aforementioned embodiment, the bent portion 12 is curved.

Finally, the embodiments described above are to be considered in all respects as illustrative and not limiting. The scope of the invention is indicated by the appended claims rather than by the foregoing embodiments. Furthermore, all changes which come within the meaning and range of equivalency of the claims are intended to be embraced in the scope of the invention.

What is claimed is:

1. An image reading apparatus, comprising:
    a first image reading unit including a first demagnifying optical component and a first CCD sensor, the first image reading unit being configured to read an image on a first side of a document that is transported in a predetermined direction on a horseshoe-shaped document transport path, by the first CCD sensor through the first demagnifying optical component at a first image reading position, and
    a second image reading unit including a second demagnifying optical component and a second CCD sensor, the second image reading unit being surrounded on three sides by the document transport path, the second image reading unit being configured to read an image on a second side of the document, by the second CCD sensor through the second demagnifying optical component, at a second image reading position which is located downstream of the first image reading position in a direction in which the document is transported,
    wherein a transport roller for transporting the document and a bent portion of the document transport path are arranged in this order along the direction in which the document is transported, upstream of each of the first image reading position and the second image reading position in the document transport direction,
    wherein the bent portion arranged upstream of the first image reading position is located such that the document abuts against a lower inner wall of the document transport path at the first image reading position, and
    wherein there are a plurality of bent portions between the first image reading position and the second image reading portions on the document transport path, and the plurality of bent portions between the first image reading position and the second reading position are arranged such that the document abuts against the lower inner wail of the document transport path at the second image reading position.

2. The image reading apparatus according to claim 1, further comprising:
 a document platen on which a document is placed,
 wherein the first image reading unit includes a scanning unit that is moved with respect to a document placed on the document platen to read an image on the document.

3. The image reading apparatus according to claim 2, wherein the first image reading unit reads an image on a document that is transported in a predetermined direction on the document transport path, at a home position from which the scanning unit is moved with respect to a document placed on the document platen to read an image on the document.

4. The image reading apparatus according to claim 1, wherein resolution of the first image reading unit reading images is substantially a same as resolution of the second image reading unit reading images.

5. The image reading apparatus according to claim 1, wherein a standard white board used for shading compensation in each of the first image reading unit and the second image reading unit is disposed at a position opposed to each of the first image reading unit and the second image reading unit on the document transport path.

6. The image reading apparatus according to claim 5, wherein a dirt removing member for removing dirt on a document that is being transported is disposed at positions contacting the document at the bent portion.

7. The image reading apparatus according to claim 1, wherein a plurality of rollers are arranged to abut against each of the plurality of bent portions between the first image reading position and the second image reading position on the document transport path.

* * * * *